Jan. 28, 1969
B. F. FEHLMAN
3,424,887
APPARATUS FOR WELDING PIPE JOINTS
Filed Aug. 19, 1966
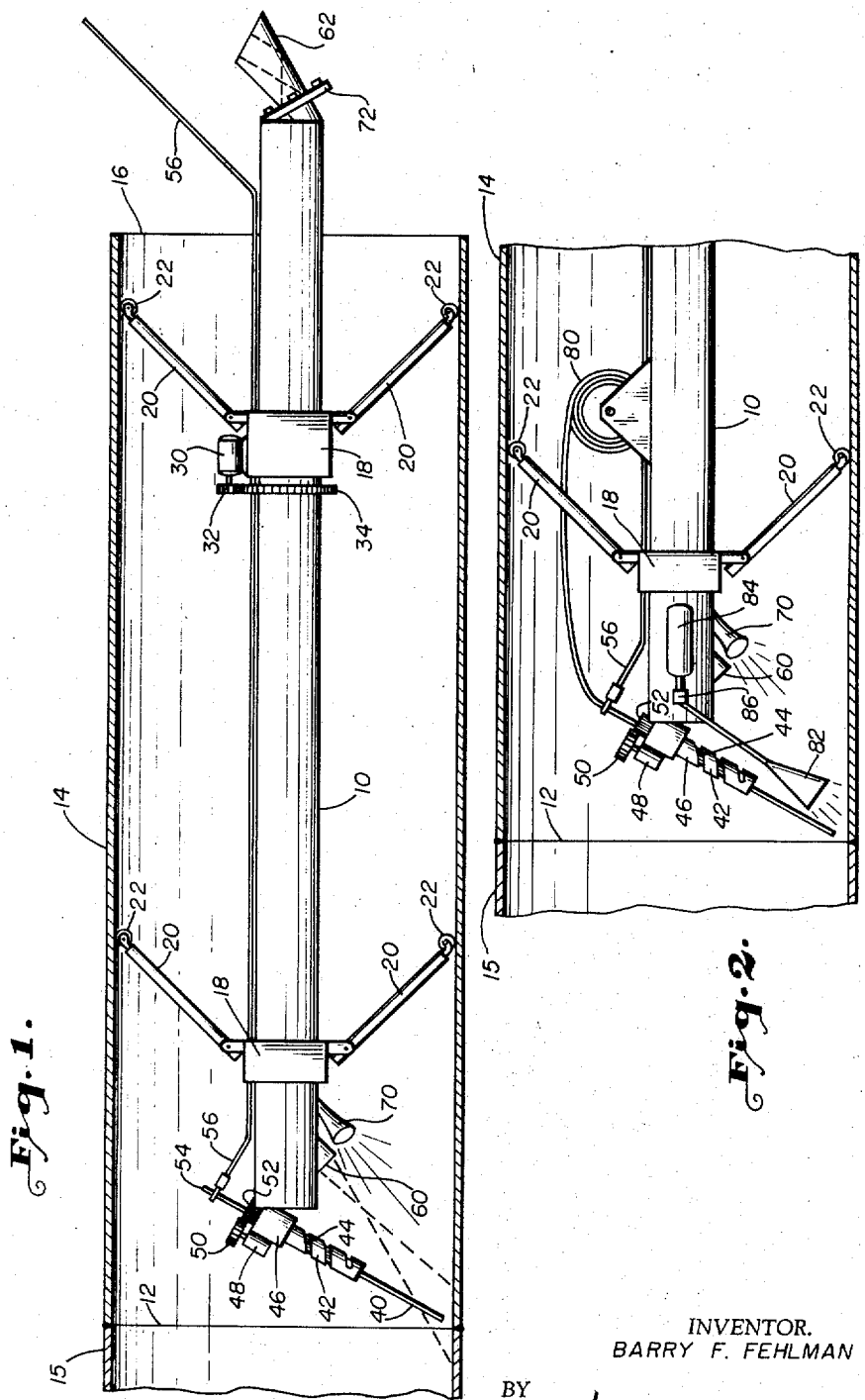
INVENTOR.
BARRY F. FEHLMAN
BY
Head & Johnson
ATTORNEYS

United States Patent Office 3,424,887
Patented Jan. 28, 1969

3,424,887
APPARATUS FOR WELDING PIPE JOINTS
Barry F. Fehlman, 144 Thomas Jefferson Drive,
San Antonio, Tex. 78228
Filed Aug. 19, 1966, Ser. No. 573,582
U.S. Cl. 219—60                              5 Claims
Int. Cl. B23k 9/02, 5/08

ABSTRACT OF THE DISCLOSURE

Internal welding of pipe joints includes means to optically inspect prior to and during the welding operation all of which is controlled from an exterior end of the pipe joint. The apparatus is adapted to rotate internally relative to the fixed pipe joint.

---

Typically, in a welded pipeline construction each joint must pass a rigid inspection including X-ray. In many instances welds are found to be defective because of lack of penetration, burn through, undercut, low bead, or other defects. In many instances these errors are made by the welder placing an exterior stringer bead or first pass weld upon the pipe joint.

Accordingly, it is an object of this invention to provide a method of pipeline construction wherein the first pass weld of a given pipeline joint is made internally. Another object of this invention to provide an apparatus for optically inspecting pipe joints for the purposes of making a preliminary inspection and internally correcting any repairs that are necessary to make the pipe joint pass inspection.

It is a further object of this invention to provide apparatus for optically inspecting and welding pipe joints internally which apparatus is readily movable and positionable within the pipe relative to the joint and in which the welding rod is maneuverable through 360° rotation by an exterior control means. A yet further object of this invention is to provide an optical viewing system and light means which optical system includes an exterior viewing mechanism for inspecting the pipe joint. The invention further provides adaptation to the various types of welding processes including the well known coated welding rod and micro-wire welding processes in which provision is made for blanketing the weld with an inert gas.

These and other objects of the invention will become more apparent upon further reading of the specification and claims when taken in conjunction with the following illustrations of which:

FIGURE 1 is a sectional view of an apparatus typical of this invention.

FIGURE 2 is a partial sectional view of an alternate welding process for use in conjunction with the methods and apparatus of this invention.

Referring now to the drawings, the apparatus includes a support casing 10 which is either a given length, telescopic or otherwise adjustable or by adding other sections such that one end will be adjacent the internal pipe joint 12 of pipe 14 and 15 while the opposite end will extend exteriorly of the end of the pipe 16 for operational control. The support casing is adapted to be maintained within the pipe 14 by a plurality of centralizers of any type well known in the pipe line art usually including a collar 18 and a plurality of normally outwardly biased arms 20 and casters 22.

One example of means to rotate the welding rod includes an electrically driven motor 30, driving sprocket 32, and the driven ring gear 34 which is attached to the support casing 10.

As shown in this view a typical coated arc welding electrode 40 is supported within a mandrel 42 which includes a spiral groove 44. The mandrel is rotatably supported relative to insulated bushing 46 which includes a follower element, not shown, which rides within grooves 44 causing the electrode to advance or retract. An electrically operated motor 48 includes a driving gear 50 and driven spline gear 52 which is adapted for axial movement within the bushing 46 to properly position a welding electrode 40 relative to the point of weld. Suitable insulated electrical connection 54 is made with electric power supply line 56 which extends exteriorly of the pipe to a welding machine generator, not shown, and of the type well known in the art. Included as a part of the support casing 10 is a prism 60 which is adapted to receive reflected light from the weld 12 and refract and/or reflect same to the exterior positioned eye piece 62, for viewing by the operator. A high intensity light source 70 is adapted to flood the area relative to the weld joint 12 for assistance in visual inspection and proper placement of the electrode. A control panel 72 is adapted to be positioned conveniently to the operator for operational control of the welding process, rod space from the weld, and the rotative movement of the support casing and welding electrode as desired. Also inclusive hereof, but not illustrated, is any well known means for adjusting the angular position of the welding electrode relative to the support casing which can be either mechanical or manually controlled linkage mechanism which sets the electrode position within the pipe or an electrically controlled motor rack and pinion type mechanism.

Although the invention has been described relative to usual arc welded coated electrode it is to be understood that this apparatus is adaptable to the continuous micro wire welding system as substantially described in FIGURE 2, wherein a substantially continuous roll of wire 80 is adapted to be positioned upon the support casing 10 with suitable control means for feeding the wire through the electrode mandrel in a continuous manner. Provision is made either by spaced and opposed gas pressure operated packer members for providing a blanket of inert gas about the weld to prevent oxidation. In the embodiment shown, the blanket is provided by a nozzle 82 from a gas supply 84 controlled by a valve 86.

In operation of the apparatus of the invention the welding electrode mandrel is preset as necessary and a coated welding electrode 40 or the continuous wire as shown in FIGURE 2 is inserted and retained, as with a chuck device, within mandrel 42. Motor 48 is reversible and can properly locate the rod for insertion within the tubing. The support casing, its centralizing support members 18, 20 and 22, are inserted within the pipe and adjusted for the pipe diameter and length whereby a portion of the support casing will extend beyond the end of the pipe casing 16. This extension can be caused by a telescopic support casing or by the additional casings being added to provide the proper length. Once the approximate position of the welded joint 12 is reached the high intensity light 70 if not already turned on provides illumination of the joint which is viewed by the operator 62 who by proper control may place the welding electrode 40 at its proper position.

In practicing the method of one embodiment of this invention the welding process includes making a first pass connection interiorly prior to making an exterior weld bead. Thusly, it is found that irregularities and defects are no longer a problem to a favorable inspection. In the event the exterior weld is placed first then the apparatus of this invention is utilized as an internal inspection and repair device and method. The welded joint is first inspected for any places which would be considered improper or incapable of passing inspection. This includes lack of penetration of the weld from the outside, burn through, undercutting welds and low bead welded or any other defects. If such places are located or seen by the operator the welding generator is started and the repair is made as necessary. By suitable electrical control, reversible motor 30 is actuated to rotate the electrode a full 360° relative to pipe joint 12. Further control permits adjustment by way of motor 48, driven gear 50 and spline gear 52 to adjust the welding electrode to its proper spacing and relationship to the joint.

The invention has been described with reference to specific and preferred embodiments. It will be apparent, however, that other modifications can be made without departing from the spirit or the scope of this invention. Accordingly, this invention should be construed not to be limited to the embodiment herein described, but should be limited only by the scope of the appended claims.

What is claimed:

1. Apparatus for optically inspecting and welding internal joints of stationary pipe members comprising:
    a rotatable support member positioned within one of said pipe members and extending from adjacent said joint to an exterior open end of one of said pipe members;
    a welding rod holder attached to said support member at that end adjacent said joint and contiguous thereto;
    means to controllably feed, from said exterior end, said rod relative to said joint so as to be at the proper welding space;
    means to controllably adjust, from said exterior end, said rod holder position; and
    means to reflectively and/or refractively optically view said joint, the relative relationship of said rod and said weld.

2. Apparatus according to claim 1 wherein said welding rod is of the continuous wire type and including:
    means to controllably feed from said exterior end said wire to said rod holder, and
    means to blanket the area of said welding operation with an inert gas.

3. Apparatus according to claim 2 wherein said means to blanket includes inert gas responsive packing member to effectively seal said area.

4. Apparatus according to claim 1 wherein said means to controllably feed said welding rod includes electric motor driven rod holder to rotably advance said rod.

5. Apparatus according to claim 1 wherein said optical system includes an electric high intensity light adjacent the welding operational end of said support member.

References Cited

UNITED STATES PATENTS

| | | | |
|---|---|---|---|
| 3,009,049 | 11/1961 | Stanley | 219—60 |
| 3,009,048 | 11/1961 | Stanley | 219—60 |
| 1,869,351 | 7/1932 | Lincoln | 219—60 |
| 2,254,314 | 9/1941 | Reed | 228—42 |
| 2,796,508 | 6/1957 | Holman | 228—42 |

RICHARD H. EANES, JR., *Primary Examiner.*

U.S. Cl. X.R.

228—42